UNITED STATES PATENT OFFICE.

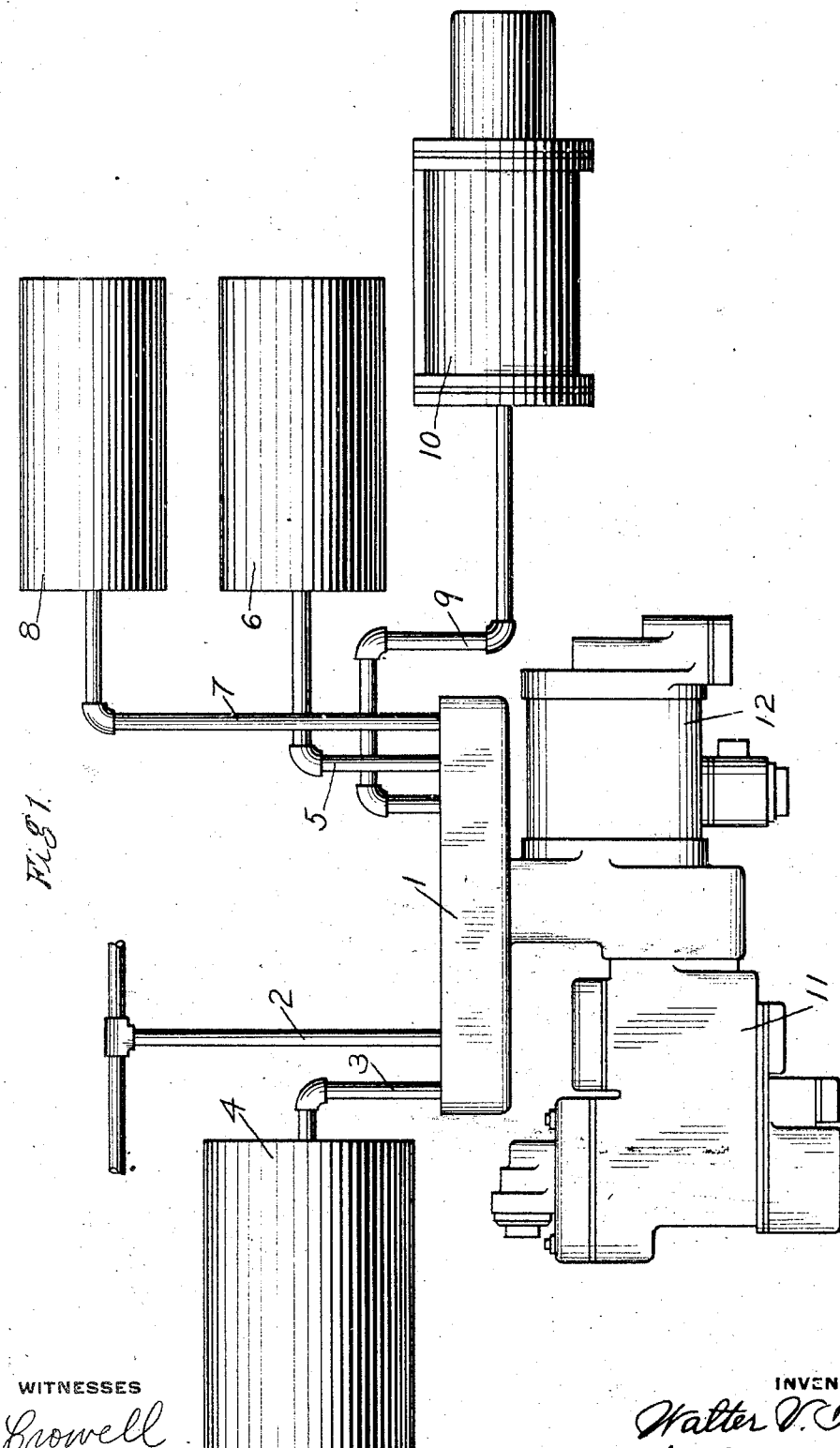

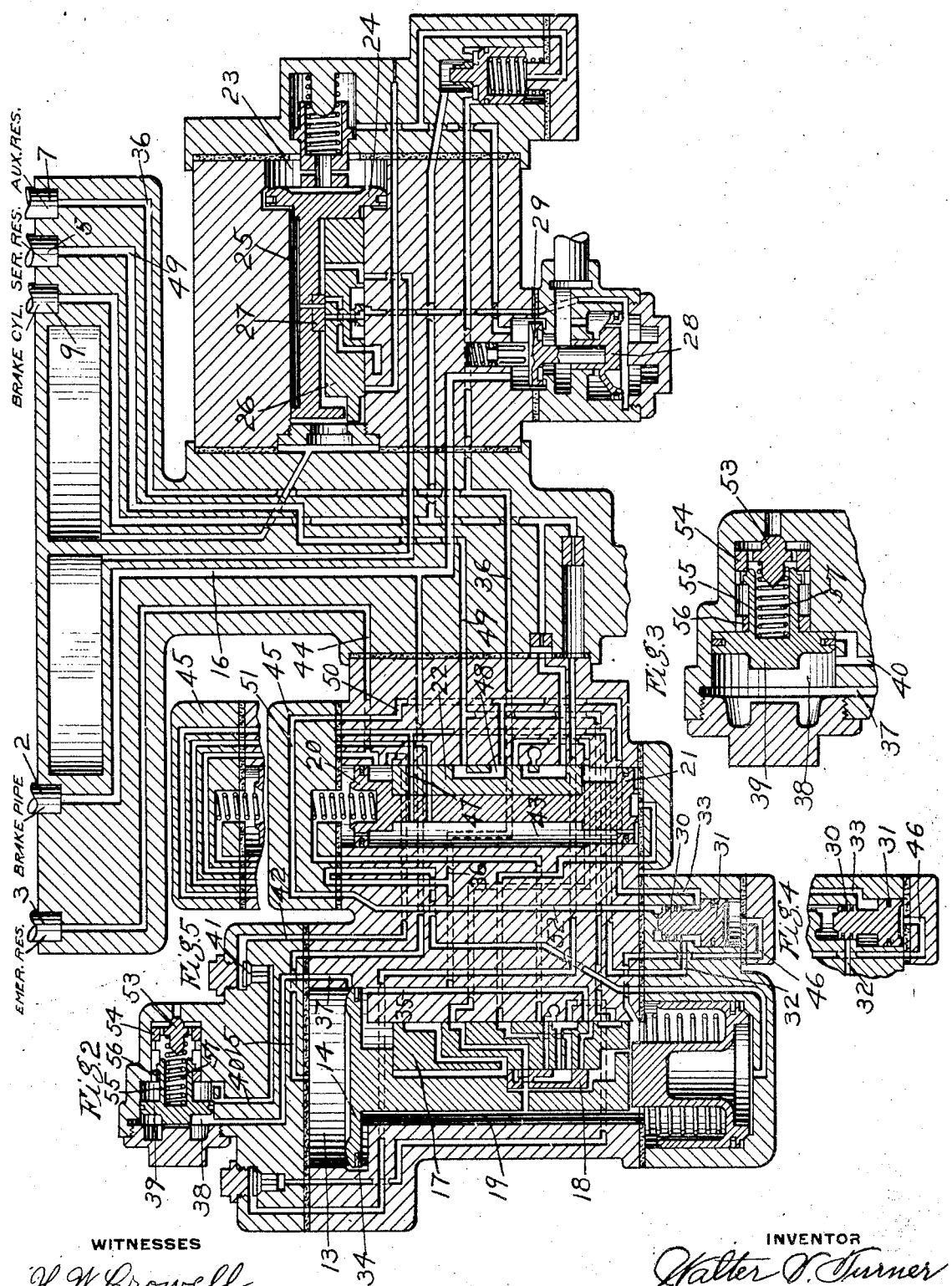

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE APPARATUS.

1,199,838.  Specification of Letters Patent.  Patented Oct. 3, 1916.

Application filed September 26, 1914. Serial No. 863,635.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brake Apparatus, of which the following is a specification.

This invention relates to fluid pressure brakes, and more particularly to a valve mechanism for controlling the application and release of the brakes. In connection with apparatus of the above character, an additional reservoir such as the so-called emergency reservoir is frequently employed and in order to charge this reservoir with fluid under pressure, a connection containing a check valve may be provided between the brake pipe and the reservoir. There is a possibility of this check valve leaking and if after an application of the brakes, the equalizing valve parts on the car having the leaky check valve should happen to move to release position by reason of an auxiliary reservoir leak or otherwise, fluid may then flow from the additional reservoir to the brake pipe and raise the brake pipe pressure sufficiently to cause all the triple valves in the train to move to release position.

One object of my invention is to provide means for preventing leakage from the additional reservoir from flowing into the brake pipe. For certain reasons, it has heretofore been proposed to provide a relatively small auxiliary reservoir the pressure in which opposes brake pipe pressure in all positions of the equalizing or triple valve device and a separate larger reservoir termed the service reservoir which is adapted to be connected to the smaller reservoir upon movement of the triple valve parts to effect an application of the brakes. In order to provide for a prompt release of the brakes, it has been proposed to employ means for preventing the recharge of the service reservoir until the auxiliary reservoir pressure has been recharged to within a few pounds of the standard pressure carried in the system. With this arrangement, if after an application of the brakes is made, the parts are shifted to recharging position, the auxiliary reservoir will be recharged first and if a second application of the brakes is now made, the movement of the equalizing valve parts toward service application position will uncover the port for connecting the service to the auxiliary reservoir. This is liable to halt the movement of the parts by reason of the reduction in auxiliary reservoir pressure by flow to the service reservoir, so that a re-application cannot be made as promptly as desired.

Another object of my invention is to insure that the brakes can be promptly applied on re-application by providing means for recharging the service reservoir at substantially the same rate as the auxiliary reservoir is recharged from the brake pipe.

Other objects and advantages will appear in the following more detailed description of the invention.

In the accompanying drawings; Figure 1 is a diagrammatic view of a car air brake equipment with my improvement applied thereto; Fig. 2 a sectional view of a valve mechanism for controlling the application and release of the brakes and embodying my invention; Fig. 3 an enlarged sectional view of the valve device for relieving leakage from the emergency reservoir, showing the same in position for charging the reservoir from the brake pipe; Fig. 4 a sectional view of the recharging valve device in the position for closing communication from the emergency reservoir to the service reservoir; and Fig. 5 a sectional view of the release piston cap in the graduated release position.

As shown in Fig. 1 of the drawings; the brake application and release valve mechanism may comprise a pipe bracket 1 having connection to brake pipe 2, pipe 3, leading to emergency reservoir 4, pipe 5, leading to service reservoir 6, pipe 7, leading to auxiliary reservoir 8, and pipe 9, leading to brake cylinder 10. An equalizing portion 11 and an emergency portion 12 are secured to the pipe bracket 1 so as to effect registry with the various passages in the pipe bracket. The equalizing portion has a piston chamber 13 containing piston 14 and open through passages 15 and 16 to brake pipe 2, and said piston operates a main slide valve 17 and a graduating valve 18 contained in valve chamber 19. For controlling the release of the brakes a separate release valve device may be employed comprising a differential piston having piston heads 20 and 21 and a slide valve 22 adapted to be operated by said piston. The emergency portion 12 has a piston chamber 23 containing piston 24 and a valve chamber 25 containing slide valve 26 and auxiliary slide valve 27 adapted to be operated by piston 24. A quick action valve device may also be embodied in the emergency portion, comprising a piston 28 and a valve 29 adapted to be actuated by said piston. For controlling the recharge of the service reservoir, a recharging valve device is provided having differential piston heads 30 and 31 with an annular recess intermediate the heads which is adapted in one position to connect passage 32 with passage 33 and in the opposite position to cut off communication therebetween.

In operation, fluid supplied to the brake pipe 2, flows through passages 16 and 15 to the equalizing piston chamber 13 and thence through the usual feed groove 34 to valve chamber 19. The auxiliary reservoir 8 is charged from valve chamber 19 through passages 35 and 36 and the emergency reservoir 4 is charged from piston chamber 13, when the piston 14 is in full release position, through passage 37 which leads to piston chamber 38 of a collapsible piston 39, the purpose of which will be hereinafter explained. The fluid pressure in chamber 38 operates to shift the piston 39 so as to uncover the passage 40 and fluid then flows through passage 40, lifting check valve 41, to passage 42 which opens into release valve chamber 43 when the release slide valve 22 is in release position. From valve chamber 43 fluid flows through passage 44 to emergency reservoir pipe 3. When graduated release is cut out, the release cap 45 is applied as shown in Fig. 2 of the drawings, and the service reservoir 6 is charged from the emergency reservoir 4. Fluid at auxiliary reservoir pressure is admitted through passage 46 to the outer face of piston head 31 of the charging valve device and operates to shift same to the position shown in Fig. 2. In this position, fluid can flow from release valve chamber 43 through port 47 and passage 32 to the annular chamber between piston heads 30 and 31 and thence through passage 33, cavity 48 and passage 49 to service reservoir pipe 5. The chamber at the outer face of the piston head 30 is also charged with fluid at service reservoir pressure through passage 50, cavity 51 in release cap 45, and passage 52.

With the construction above described, when an application of the brakes is effected, the charging valve device will be forced to the position shown in Fig. 4 by the reduction in auxiliary reservoir pressure on the piston head 31 by flow to the brake cylinder. Fluid is also supplied from the service reservoir to the brake cylinder, since in application position the service reservoir is open to the auxiliary reservoir. If the brake pipe pressure be now increased so as to shift the parts to release and recharging position, the auxiliary reservoir will be recharged from the brake pipe through the usual feed groove and the charging valve device will be immediately shifted to the position shown in Fig. 2, by the increase in auxiliary reservoir pressure, so that communication is opened from the emergency reservoir to the service reservoir. The service reservoir is thus recharged from the emergency reservoir after an application of the brakes at the same rate as the auxiliary reservoir is being recharged from the brake pipe, thus maintaining a substantial equality between the pressures of the auxiliary reservoir and the service reservoir. If under these conditions, a re-application of the brakes is made, there will not be any reduction in auxiliary reservoir pressure in application position by flow to the service reservoir, since the pressures in the two reservoirs have been maintained substantially equal.

Another feature of my invention is to prevent possible release of the brakes through concurrent leakage from the auxiliary reservoir and from the emergency reservoir to the brake pipe. For this purpose the collapsible piston 39 is provided which is adapted to operate a valve 53 carried by guide frame 54. The piston 39 has a stem 55 carrying an annular flange at the outer end which is adapted to engage a flange 56 of the frame 54. A spring 57 is interposed between the valve 53 and the piston 39 and tends to yieldingly maintain the flange 56 in engagement with the flange of the piston stem 55. If the check valve 41 should leak, the pressure of the leakage fluid will act on the inner face of the piston 39 and if the triple valve piston is shifted to release position, the outer face of the piston 39 will be subjected to brake pipe pressure. It will be evident that any tendency of leakage fluid to flow to the brake pipe will cause the piston 39 to move outwardly and thereby lift the valve 53 from its seat, so that fluid will be vented from passage 40 to the atmosphere until the pressure of fluid flowing from the emergency reservoir becomes slightly less than the brake pipe pressure, when the piston will operate to close the valve 53 and thereby prevent further venting of fluid. By this means fluid is prevented from flowing back to the brake pipe from the emergency reservoir and thus tending to effect the release of the brakes in case a triple valve should happen to be shifted to release position through leakage from the auxiliary reservoir or otherwise.

The last described feature of preventing leakage from the emergency reservoir from flowing back to the brake pipe has been covered by a divisional application, Serial No. 31,667, filed June 2, 1915.

When graduated release is cut in, the graduated release cap 45 is applied as shown in Fig. 5 of the drawings and in this case, the connections are substantially the same as those of the charging valve device covered by my Patent No. 1,139,434, dated Nov. 9, 1915 and prior pending application, Serial No. 781,731, filed July 29, 1913, the outer face of the piston head 30 being subject to fluid at emergency reservoir pressure, so that communication from the emergency reservoir to the service reservoir is not opened to permit recharging of the service reservoir until the auxiliary reservoir has been charged from the brake pipe to within a few pounds of the pressure in the emergency reservoir, according to the relative sizes of the differential piston heads 30 and 31. The object of delaying the recharging of the service reservoir from the emergency reservoir when the graduated release feature is cut in, is so that the possibility will be prevented of drawing down the emergency reservoir pressure by flow to the service reservoir, since this might reduce the emergency reservoir pressure so as to interfere with graduated release, by reason of the fact that it is the venting of fluid from the emergency reservoir to the valve chamber side of the equalizing valve device which effects graduated release. On the other hand, when graduated release is cut out and the recharging feature is retained, there is no reason for delaying the recharge of the service reservoir from the emergency reservoir, and in order to promptly recharge the emergency reservoir, connections are made for admitting fluid from the service reservoir to the small piston head of the recharging device instead of emergency reservoir pressure, so that the service reservoir will be recharged from the emergency reservoir as fast as the auxiliary reservoir is charged from the brake pipe.

Having now described my invention, what I claim as new and desire to secure by Letters Patent, is:

1. In a fluid pressure brake, the combination with a valve device for controlling an application of the brakes and a reservoir from which fluid is supplied to effect an application of the brakes, of an additional reservoir and means for charging said additional reservoir with fluid under pressure from one source of pressure while the first reservoir is being charged and at substantially the same rate from another source of pressure.

2. In a fluid pressure brake, the combination with an auxiliary reservoir, an equalizing valve device for supplying fluid from the auxiliary reservoir to effect an application of the brakes, and a service reservoir adapted to be connected to the auxiliary reservoir in making applications of the brakes, of means for charging the service reservoir with fluid under pressure from a reservoir simultaneously with and at substantially the same rate as the auxiliary reservoir is charged from the brake pipe.

3. In a fluid pressure brake, the combination with a brake pipe, an auxiliary reservoir, a service reservoir, and an equalizing valve device for supplying fluid from said reservoirs to effect an application of the brakes, of a source of fluid pressure and means for charging the service reservoir with fluid under pressure from said source while the auxiliary reservoir is being charged from the brake pipe and at substantially the same rate.

4. In a fluid pressure brake, the combination with a brake pipe, an auxiliary reservoir adapted to be charged with fluid under pressure from the brake pipe, a service reservoir, and an equalizing valve device for supplying fluid from said reservoirs to effect an application of the brakes, of a storage reservoir normally charged with fluid under pressure and means for charging the service reservoir with fluid under pressure from the storage reservoir while the auxiliary reservoir is being charged from the brake pipe and at substantially the same rate.

5. In a fluid pressure brake, the combination with a brake pipe, an auxiliary reservoir adapted to be charged with fluid under pressure from the brake pipe, a service reservoir, and an equalizing valve device operating upon a reduction in brake pipe pressure for supplying fluid from the auxiliary reservoir and the service reservoir to effect an application of the brakes, of an emergency reservoir adapted to be charged with fluid under pressure from the brake pipe and means for charging the service reservoir with fluid under pressure from the emergency reservoir while the auxiliary reservoir is being charged from the brake pipe and at substantially the same rate.

6. In a fluid pressure brake, the combination with a brake pipe, an auxiliary reservoir and an emergency reservoir adapted to be charged with fluid under pressure from the brake pipe, of a service reservoir and a differential piston device subject to the opposing pressures of the service reservoir and the auxiliary reservoir for charging the service reservoir from the emergency reservoir while the auxiliary reservoir is being charged from the brake pipe.

7. In a fluid pressure brake, the combination with a brake pipe, an auxiliary reservoir and an emergency reservoir adapted to be charged with fluid under pressure from the brake pipe, of a service reservoir and a differential piston device having the larger piston head subject to auxiliary reservoir pressure and the smaller piston head subject to service reservoir pressure and adapted to supply fluid from the emergency reservoir to the service reservoir while the auxiliary reservoir is being charged from the brake pipe and at substantially the same rate.

8. In a fluid pressure brake, the combination with a brake pipe, an auxiliary reservoir, and an emergency reservoir adapted to be charged with fluid under pressure from the brake pipe, of a service reservoir, a piston device subject on one side to auxiliary reservoir pressure, for controlling the supply of fluid from the emergency reservoir to the service reservoir, and means adapted in one position to supply fluid from the emergency reservoir to the opposite side of the piston device and in another position from the service reservoir.

9. In a fluid pressure brake, the combination with a brake pipe, an auxiliary reservoir, and an emergency reservoir adapted to be charged with fluid under pressure from the brake pipe, of a service reservoir, a piston device having a large piston head, subject to auxiliary reservoir pressure, and a small piston head, and means adapted in one position to admit fluid from the emergency reservoir to the small piston head and in another position from the service reservoir to said piston head.

10. In a fluid pressure brake, the combination with a brake pipe, an auxiliary reservoir, and an emergency reservoir adapted to be charged with fluid under pressure from the brake pipe, of a service reservoir, a piston device having a large piston head, subject to auxiliary reservoir pressure, and a small piston head, and a manually operable cap adapted in one position to connect passages for supplying fluid from the emergency reservoir to the small piston head and in another position to connect passages for supplying fluid from the service reservoir to said piston head.

In testimony whereof I have hereunto set my hand.

WALTER V. TURNER.

Witnesses:
A. M. CLEMENTS,
S. W. KEEFER.